Aug. 29, 1944.   H. G. DOLL   2,357,178
METHOD AND APPARATUS FOR INVESTIGATING BORE HOLES
Filed Dec. 13, 1939   2 Sheets—Sheet 1
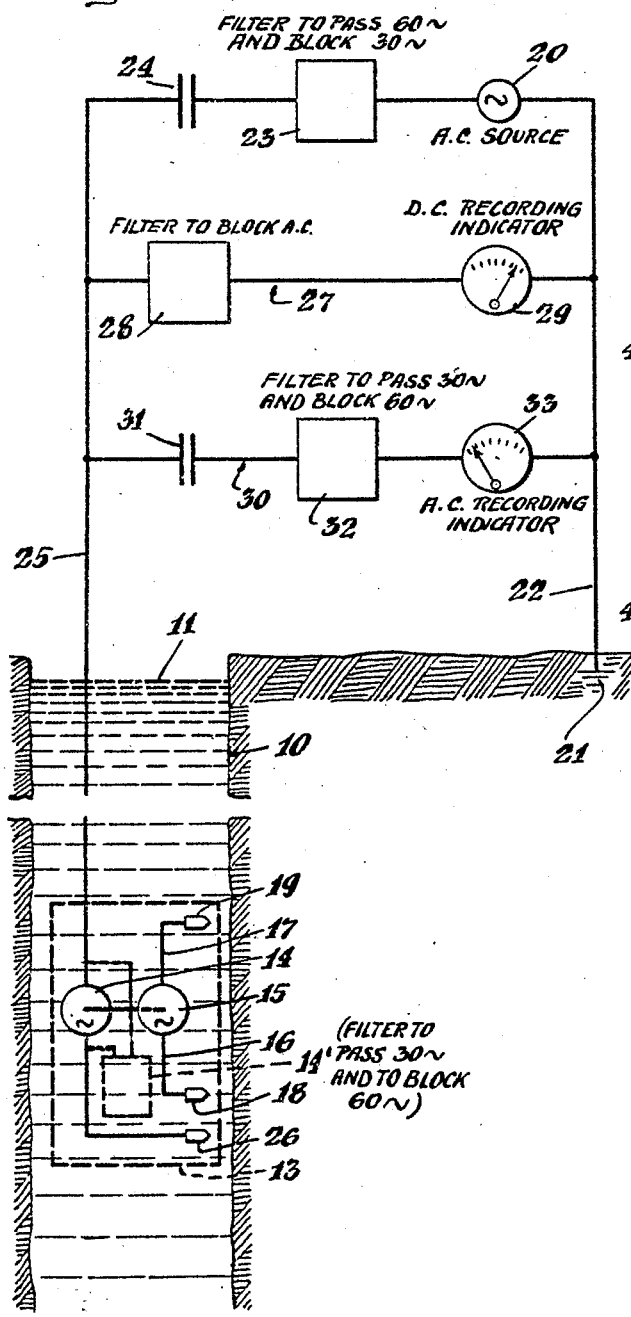
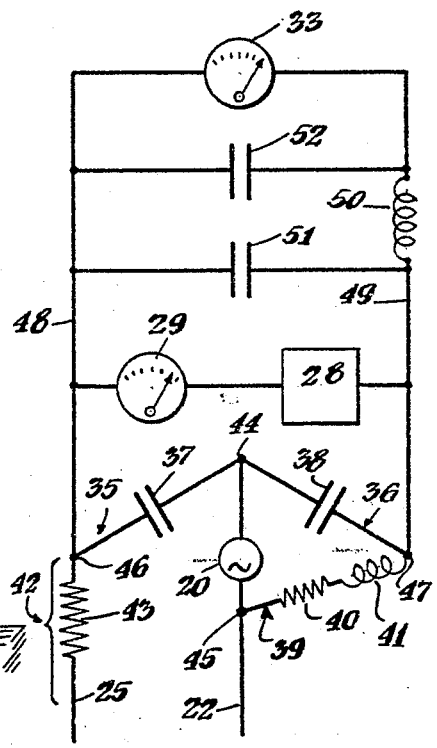
INVENTOR
Henri Georges Doll
BY
his ATTORNEYS Aug. 29, 1944.  H. G. DOLL  2,357,178
METHOD AND APPARATUS FOR INVESTIGATING BORE HOLES
Filed Dec. 13, 1939  2 Sheets-Sheet 2
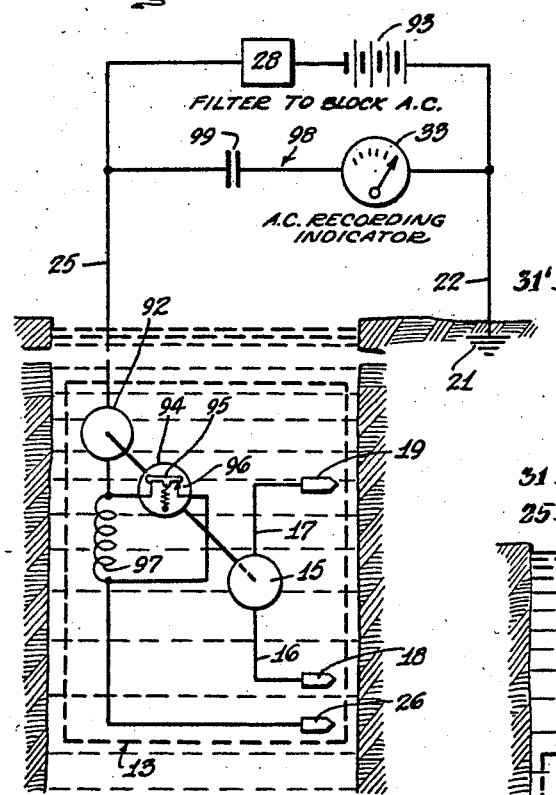
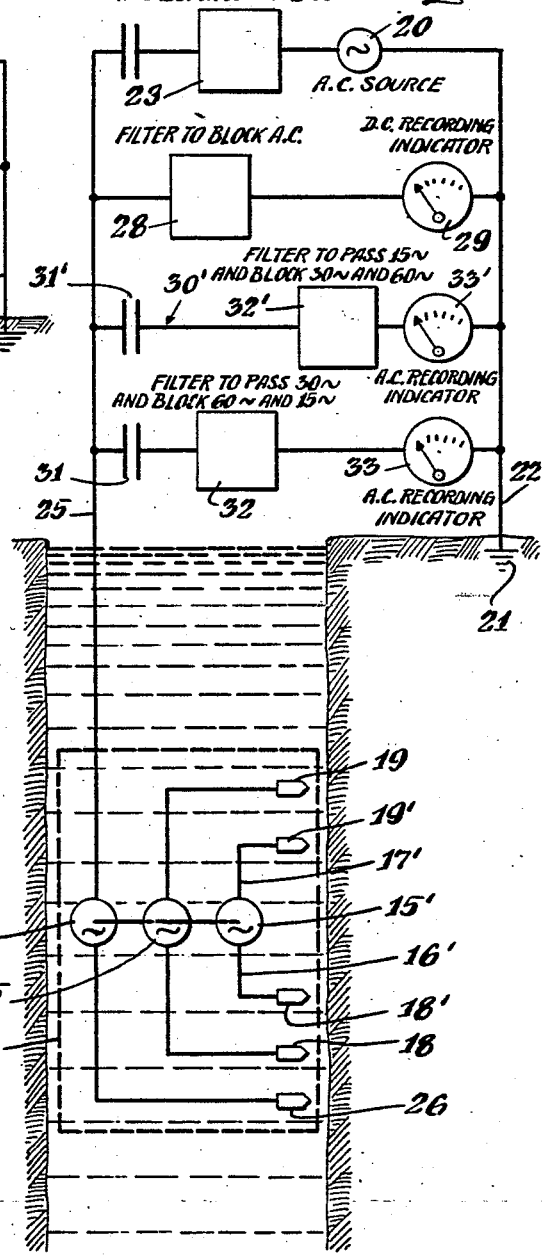
INVENTOR
Henri Georges Doll
BY
Hognet, Meary & Campbell
his ATTORNEYS

UNITED STATES PATENT OFFICE 2,357,178

METHOD AND APPARATUS FOR INVESTIGATING BOREHOLES

Henri Georges Doll, Paris, France, assignor, by mesne assignments, to Schlumberger Well Surveying Corporation, Houston, Tex., a corporation of Delaware Application December 13, 1939, Serial No. 308,942
In France December 16, 1938

11 Claims. (Cl. 175—182)

The present invention relates to methods and apparatus for investigating bore holes drilled into the earth.

More particularly, it relates to methods and apparatus for investigating bore holes in which investigation apparatus disposed in the bore hole is energized by a source of electrical energy located at the surface of the earth, and the response of the apparatus is transmitted electrically to indicating means also at the surface of the earth.

In prior art methods of this character, it has been the practice heretofore to employ one conductor for supplying electrical energy from the source to the investigation apparatus in the bore hole, and a separate conductor or conductors for transmitting the response of the apparatus to the indicating means at the surface of the earth.

It is a primary object of the present invention to provide a new and improved method and apparatus for investigating bore holes, in which a single circuit is utilized both for supplying electrical energy from a source at the surface of the earth to investigation apparatus in the bore hole, and for transmitting the response of the investigation apparatus electrically to indicating means at the surface of the earth.

Another object of the invention is to provide an improved method and apparatus for simultaneously investigating a plurality of different subjects of interest in a bore hole in which electrical values related to the respective subjects being investigated are transmitted from the investigation apparatus in the bore hole to indicating means at the surface of the earth through the same circuit which supplies electrical energy to the investigation apparatus from a source at the surface of the earth.

In general, the invention may be applied to the investigation of any subject or subjects of interest in a bore hole which are capable of being detected electrically. Of particular interest are those subjects which provide information about the nature of the strata traversed by a bore hole, such as, for example, the relative impedance, apparent resistivity and thermal conductivity of these strata, and the spontaneous potentials existing in the bore hole. Those subjects of investigation which provide information regarding conditions in the bore hole are also important, and they may include, for example, the temperature of the bore hole, and the temperature and resistivity of any liquid contained therein.

For convenience, however, the invention will be described herein only as applied to the investigation of the apparent resistivity of the strata traversed by a bore hole, the spontaneous potentials existing therein, and both of these subjects simultaneously.

In a preferred embodiment of the invention, the investigation apparatus located in the bore hole is electrically connected to a source of electrical energy and suitable indicating apparatus located at the surface of the earth, through a single electrical circuit which will be designated hereinafter as the main circuit. Electrical current of given character is fed through the main circuit to the investigation apparatus in the bore hole where it serves to energize means for providing one or more currents which are separably different in character from each other and from the feed current. The last named current or currents are fed to a circuit or circuits associated with the investigation apparatus in the bore hole, which will be referred to in the following description as secondary circuits, where they are utilized to obtain indications of the subject or subjects of investigation.

The indications are obtained in the form of currents having the same character as the respective currents in the corresponding secondary circuits, and they are transmitted through the main circuit to the surface of the earth, where they are indicated separately by the indicating apparatus.

In order to obtain current of different character from current of given character, any conventional current conversion device may be used, such as, for example, a motor designed for operation at one frequency driving one or more alternators of different frequency.

Other features of the invention will become apparent from the following detailed description of several embodiments taken with reference to the accompanying drawings, in which:

Figure 1 is a schematic diagram of apparatus constructed in accordance with the invention for simultaneously obtaining indications of the apparent resistivity of earth strata traversed by a bore hole, and the spontaneous potentials existing therein;

Figure 2 illustrates schematically a modified form of measuring apparatus for use with the investigating circuit shown in Figure 1;

Figure 3 is a schematic diagram of a further embodiment of the invention in which direct current is fed to the investigation apparatus in the bore hole;

Figure 4 is a schematic diagram of apparatus constructed according to the invention for obtaining indications of the apparent resistivity of the strata at two different depths of investigation.

The apparatus shown in Figure 1 of the drawings illustrates the application of the invention to the simultaneous investigation of the apparent resistivity of the strata traversed by a bore hole 10 and the spontaneous potentials existing therein. The bore hole 10 will usually contain liquid or mud 11, from previous drilling operations.

Lowered in the bore hole 10 is an investigation apparatus 13 which comprises a synchronous motor 14 adapted to drive an alternator 15 for supplying current of a given frequency, such as, for example, 30 cycles, through conductors 16 and 17, respectively, to a pair of spaced electrodes 18 and 19 respectively. The circuit including the alternator 15, the conductors 16 and 17 and the electrodes 18 and 19 comprises a secondary circuit, and its function is to set up an alternating electrical field in the formations surrounding the bore hole 10.

The synchronous motor 14 is adapted to be energized from a source of alternating current 20 located at the surface of the earth, through a main circuit which comprises a ground 21, a conductor 22, the alternating current source 20, a filter 23, a condenser 24, a single conductor cable 25, the motor 14 and an electrode 26 which is disposed in the bore hole a short distance away from the electrode 18. This circuit is completed through the liquid 11 in the bore hole 10 and the earth strata between the electrode 26 and the ground 21.

For the purpose of this description, it will be convenient to assume that the spacing between the electrode 18 and the electrode 26 is of the order of magnitude of the diameter of the bore hole, while the electrode 19 is spaced a few meters from the electrode 18. However, it should be clearly understood that this particular electrode spacing is given merely by way of example, and any other conventional spacing may be used, depending upon the results desired.

The alternating current source 20 is adapted to provide alternating current having a frequency different from that supplied by the alternator 15 in the bore hole. For convenience, it will be assumed that the source supplies 60 cycle alternating current, in which case the characteristics of the filter 23 will be such that 60 cycle current will flow through it readily, whereas the flow of currents of other frequencies, particularly 30 cycles, will be prevented. The condenser 24 serves to prevent the flow of any direct current through the source 20.

Connected in shunt with the alternating current source 20, filter 23 and the condenser 24, is a circuit 27 for obtaining indications of continuous potentials between the electrode 26 in the bore hole and the ground 21. The respective ends of the circuit 27 are connected to the cable 25 and the wire 22, and it comprises an electrical filter 28 and an instrument 29 for indicating continuous potentials. The filter 28 is designed to pass continuous currents and to block the passage of alternating currents, particularly 30 or 60 cycle alternating currents. The indicating instrument 29 is preferably of the recording type which enables a continuous record of the variable being indicated to be obtained.

A second indicating circuit 30 is also connected across the cable 25 and the conductor 22, which enables indications to be obtained of alternating potential differences between the electrode 26 and the ground 21. The circuit 30 includes a condenser 31, a filter 32 and a recording type indicating instrument 33, which is responsive to alternating potential differences. The condenser 31 prevents any continuous current from flowing in the circuit 30, and the filter 32 is designed to pass 30 cycle alternating current and to block the passage of other alternating currents, particularly 60 cycle alternating currents, so that the indicating instrument 33 is responsive only to 30 cycle alternating potential differences.

In operation, the synchronous motor 14 of the investigation apparatus 13 is driven continuously by 60 cycle alternating current provided by the alternating current source 20 at the surface of the earth. The motor 14 drives the alternator 15 which supplies 30 cycle alternating current to the electrodes 18 and 19, thereby creating a 30 cycle alternating electrical field in the formations surrounding the bore hole. This electrical field in the formations produces an alternating potential difference between the electrode 26 and the grounded point 21 at the surface of the earth, the amplitude of which is proportional to the apparent resistivity of the stratum in the neighborhood of the electrodes 18 and 26, as disclosed in the copending application of Conrad Schlumberger, Serial No. 21,072, filed May 11, 1935, now Patent No. 2,317,304, issued April 20, 1943.

This alternating potential difference is transmitted through the cable 25 to the surface of the earth, where it is indicated by means of the indicating instrument 33, which is responsive to 30 cycle alternating potentials only.

At the same time, a continuous potential difference usually exists between the electrode 26 in the bore hole and the grounded point 21 at the earth's surface which results from the currents which exist spontaneously in bore holes, especially in the neighborhood of porous strata, as disclosed in prior United States Patent No. 1,913,293. This potential difference is transmitted through the cable 25 and is indicated by the indicating instrument 29, which is responsive to continuous currents only, and which is not affected by either the 30 or 60 cycle alternating currents flowing in the cable 25.

It should be noted that the impedance of the secondary circuit constituted by the alternator 15, the conductors 16 and 17, and the electrodes 18 and 19 should be high enough to produce a substantially uniform flow of current therein, regardless of variations in the resistance of the surrounding muds and formations which complete the circuit. Where this condition obtains, the 30 cycle potential difference between the electrode 26 and the grounded point 21 will be substantially directly proportional to the apparent resistivity of the strata in the neighborhood of the electrode system.

Where more accurate indications of the apparent resistivity of the strata are desired, the source of voltage and the indicating apparatus located at the surface of the earth may be connected as illustrated in Figure 2. In this embodiment the main circuit forms one arm of a balanced alternating current bridge, across the respective diagonals of which the source of voltage and the indicating apparatus are connected.

Considering Figure 2, a conventional alternating current bridge is shown in which the two adjacent arms 35 and 36 comprise "capacitive" resistances, such as for example, the identical condensers 37 and 38, and the arm 39 includes a resistance 40 and an inductance 41 in series. The fourth arm 42 of the bridge comprises a resistance 43, the cable 25, the conductor 22, and the remainder of the main circuit disclosed in Figure 1. The source of 60 cycle alternating current 20 is connected across the apices 44 and 45 of the bridge, supplying 60 cycle current through the cable 25 in the arm 42 for the operation of the motor 14 in the bore hole.

The values of the resistance 40 and the inductance 41 in the arm 39 are so chosen that for a frequency of 60 cycles, the impedance of this arm is equal to the impedance of the arm 42 in which the main circuit is included. Further, the value of the resistance 43 should be such that the total impedance of the bridge arm 42 is relatively large as compared with the resistance of the liquid and the formations between the electrode 26 in the bore hole and the ground 21. Where these conditions obtain, the bridge will remain in equilibrium for all positions of the investigation apparatus 13 in the bore hole, and no 60 cycle alternating potential difference will exist across the apices 46 and 47 of the bridge.

However, the 30 cycle alternating potential difference produced between the electrode 26 and the ground 21 by the 30 cycle electric field set up in the formations, produces a corresponding 30 cycle alternating potential difference across the apices 46 and 47 of the bridge, which is proportional to the apparent resistivity of the formations in the neighborhood of the investigation apparatus 13. This potential difference is transmitted through the conductors 48 and 49 respectively to the alternating current recording type indicating instrument 33.

If necessary, the output from the bridge may be filtered to insure that no 60 cycle alternating potentials will be impressed upon the indicating instrument 33. Any conventional filter circuit designed to pass only 30 cycle alternating current may be used for this purpose, such as, for example, an inductance 50 connected in series with the conductor 49, and several condensers 51 and 52 connected across the conductors 49 and 48.

The spontaneous potential differences produced between the electrode 26 and the ground 21 produce corresponding continuous potential differences across the apices 46 and 47 of the bridge. Indications of these potential differences may be obtained from the recording type indicating instrument 29 which is connected across the conductors 48 and 49. A filter 28 may be inserted in series with the indicating instrument 29 for preventing the passage of any alternating current thereto.

If desired, direct current can be used to drive a direct current motor in the bore hole, as shown in Fig. 3, instead of the synchronous motor 14 which is used with the apparatus shown in Figure 1. In Figure 3, a direct current motor 92 is connected in series with the cable 25 and is energized from a direct current source such as, for example, a battery 93, which is connected to the conductor 22 and the cable 25 at the surface of the earth.

In order to maintain a constant speed, it is desirable to provide a conventional type governor for the motor 92. This may be, for example, a centrifugal type governor, comprising a disc 94 secured to the shaft of the motor 92, on which are mounted a spring biased contact arm 95 and a contact 96. The contact arm 95 is adapted to engage the contact 96 to short circuit all or a portion of the field winding 97 of the motor 92 when its speed falls below a predetermined limiting value. As is known, a device of this character will maintain the speed of the motor 92 at a constant value.

As in the modification shown in Figure 1, the motor 92 drives a 30 cycle alternator 15 which is connected through the conductors 16 and 17 to the electrodes 18 and 19 respectively. The flow of 30 cycle alternating current from the electrodes 18 and 19 produces a 30 cycle alternating potential difference between the electrode 26 and the ground 21 which is transmitted through the cable 25 to an indicating circuit 98 connected across the cable 25 and the conductor 22 at the surface of the earth. The indicating circuit 98 may include a condenser 99 which serves to prevent the passage of direct current therethrough, in series with the indicating instrument 33, which may be, for example, an alternating current galvanometer, preferably of the vibration type.

In order to prevent any 30 cycle alternating current from passing through the battery 93, it may be desirable to connect in series therewith a conventional filter 28 suitably designed for the purpose.

In the modification shown in Figure 4, the apparatus enables simultaneous indications to be obtained of the apparent resistivity at two different depths of investigation, in addition to the spontaneous potentials existing in the bore hole. The expression "depth of investigation," as used herein and in this art, means generally, "lateral" depth or horizontal distance, as referred to the wall of the bore hole. The apparatus shown in Figure 4 is substantially identical with the apparatus disclosed in Figure 1, the only difference being that an additional secondary circuit is provided in the bore hole and a corresponding indicating circuit is provided at the surface of the earth.

Referring to Figure 4, the additional secondary circuit includes a 15 cycle alternator 15' which is connected by conductors 16' and 17' to the electrodes 18' and 19'. The 15 cycle alternator 15' is adapted to be driven by the synchronous motor 14, together with the 30 cycle alternator 15.

The corresponding indicating circuit 30' located at the surface of the earth is connected across the cable 25 and the conductor 22 and it serves to provide indications of 15 cycle alternating potential differences between the electrode 26 and the ground 21. Included in the indicating circuit 30' is a condenser 31' which serves to block the passage of direct current, a filter 32' which is designed to pass 15 cycle alternating current, but to block alternating currents of different frequencies, particularly 30 and 60 cycle alternating currents and a recording type indicating instrument 33' responsive to 15 cycle alternating potential differences.

Although any conventional electrode spacing may be used, the electrodes 19 and 19' should preferably be located at a relatively great distance from the electrode 26 such as for example, from 5 to 50 meters away, so that the current flowing through these electrodes will create only a negligible potential difference between the electrode 26 and the ground 21. On the other hand, the electrodes 18 and 18' should be located preferably at relatively short distances from the electrode 26. For example, the electrode 18 may be placed from the electrode 26 a distance in the neighborhood of the diameter of the bore hole, while the electrode 18' may be spaced approximately five times this distance from the electrode 26.

In operation, the synchronous motor 14 is energized by 60 cycle alternating current supplied from the 60 cycle source 20 at the surface of the earth through the cable 25, and it drives both the 30 cycle alternator 15 and the 15 cycle alternator 15'. The 30 cycle alternator 15 supplies a 30 cycle alternating current to the electrodes 18 and 19, thereby creating a 30 cycle alternating field in the formations surrounding the bore hole.

This 30 cycle alternating field produces a 30 cycle alternating potential difference between the electrode 26 and the ground 21, causing a corresponding alternating current to flow through the cable 25, the condenser 31 and the filter 32 to the indicating instrument 33, where it provides indications which are a function of the apparent resistivity at one depth of investigation in the bore hole.

At the same time, the 15 cycle alternator 15' supplies a 15 cycle alternating current to the electrodes 18' and 19' setting up a corresponding 15 cycle alternating electrical field in the formations surrounding the bore hole, and producing a 15 cycle alternating potential difference between the electrode 26 and the ground 21. This 15 cycle alternating potential difference is transmitted through the cable 25, the condenser 31' and the filter 32' to the 15 cycle indicating instrument 33' where it provides indications of the apparent resistivity of the strata surrounding the bore hole at a different depth of investigation.

The spontaneous potentials existing in the bore hole produce continuous potential differences between the electrode 26 and the ground 21 which are transmitted through the cable 25 and the filter 28 to the continuous current indicating instrument 29. For this purpose, the filter 28 should be designed to block the passage of all alternating currents, particularly alternating currents of 15, 30 or 60 cycles. Likewise, the filter 23 should be designed to pass 60 cycle alternating currents but to block alternating currents of different frequencies, in particular 15 and 30 cycles.

In the above described methods for obtaining indications of the apparent resistivity of the strata, usually a quantity proportional to the apparent resistivity is recorded as a function of depth in the bore hole. In this fashion diagrams may be obtained which provide valuable information about the nature of the strata.

Where more accurate results are desired, however, the absolute value of the apparent resistivity may be obtained by determining the factor of proportionality between the potential difference measured and the corresponding apparent resistivity. If the intensity of the current flowing in the power circuit, and the disposition of the electrodes are known, this factor may be calculated as disclosed in prior U. S. Patent No. 1,894,328. The current flowing in the power circuit may be readily determined if the electrical characteristics of this circuit and the source of current are known.

The factor of proportionality may also be determined experimentally by disposing the electrodes in a medium of known resistivity and observing the potential difference corresponding thereto.

If the means used for converting the feed current into current of different character in any of the embodiments described above introduces a relatively large impedance into the main circuit, it may be advantageous to shunt it by a filter designed to provide a low impedance path for the indicating current or currents of different character, and to present a high impedance to the feed current. For example, if the impedance of the synchronous motor 14 in Figure 1 is relatively large, it might be shunted by a filter 14' (shown in dotted lines) designed to have a low impedance at 30 cycles and a relatively greater impedance at 60 cycles.

At several points in the above description, specific electrode arrangements and spacings have been given. Also, definite frequency values have been specified in certain of the investigation circuits. It is to be clearly understood that all of these are given merely by way of example, and any other suitable ones may be used. In particular, the ratios between the feed current of given character and the secondary circuit currents of different character need not be integral but they may have any value whatsoever other than unity.

Moreover, in the above description, in some cases reference has been made to obtaining indications of potential differences in the main circuit, whereas in other cases indications of current flowing in the main circuit are obtained. It is to be clearly understood that these indications are equivalent, and either can be made indifferently.

Where reference is made in the claims to the production of electrical energy or an electrical value of different character from electrical energy of given character, it is to be understood that a change in frequency of an alternating current is contemplated, direct current being considered for the sake of convenience as an alternating current of zero frequency. More specifically, this language comprehends the production of an alternating current of one frequency either from alternating current of a different frequency or from direct current.

While several specific embodiments have been described above, the invention is not intended to be limited thereto, but is susceptible of numerous changes in form and detail within the scope of the appended claims.

I claim:

1. Apparatus for determining the nature of earth strata traversed by a bore hole, comprising a conductor having its upper end grounded and terminating at its lower end in an electrode adapted to be lowered into the bore hole, an electric motor connected in series with said conductor near said electrode, a source of current of given character connected to said conductor at the surface of the earth for energizing said motor, an electric generator driven by said motor for producing current of different character from said energizing current, a pair of spaced electrodes connected to said generator for creating an electric field in the formations surrounding the bore hole, and means connected to said conductor at the surface of the earth for obtaining indications of potential differences produced between said first electrode and the grounded end of said conductor by the passage of said current of different character through the formations.

2. Apparatus for determining the nature of earth strata traversed by a bore hole, comprising a conductor having its upper end grounded at the surface of the earth, and terminating at its lower end in an electrode adapted to be lowered into the bore hole, an electric motor connected in series with said conductor adjacent the electrode in the bore hole, a source of alternating current of given frequency connected in series with said conductor at the surface of the earth for supplying current to said motor, an alternator of different frequency driven by said motor and having a pair of spaced electrodes connected to the terminals thereof for creating an alternating electric field in the formations surrounding the bore hole, an indicating instrument at the surface of the earth for providing indications of the potential difference between said electrode and the grounded end of said conductor, produced by said created field in the formations, and a second indicating instrument at the surface of the earth for providing indications of the potential difference between said electrode and the grounded end of said conductor produced by spontaneous potentials existing in the bore hole.

3. Apparatus for obtaining indications of at least one subject of interest in a bore hole, comprising a conductor terminating in an electrode adapted to be lowered into the bore hole, three impedances connected to the upper end of said conductor and to a grounded point to form a balanced impedance bridge, an electric motor connected in series with said conductor in the bore hole, a source of alternating current of given frequency connected across one diagonal of the bridge for supplying current to said motor, an alternator of different frequency driven by said motor and having a pair of spaced electrodes connected thereto, electrical means connected across the other diagonal of the bridge for obtaining indications of alternating potential differences having the same frequency as the alternator in the bore hole, and direct current indicating means connected across said other diagonal of the bridge.

4. Apparatus for determining the nature of earth strata traversed by a bore hole, comprising a conductor having its upper end grounded and terminating at its lower end in an electrode adapted to be lowered into the bore hole, a direct current motor disposed in the bore hole with said electrode and connected in series with said conductor, a source of direct current at the surface of the earth for supplying current to said motor, an alternator driven by said motor and having a pair of spaced electrodes connected to the terminals thereof for setting up an alternating current field in the formations surrounding the bore hole, and means at the surface of the earth for obtaining indications of the alternating potential difference between said first electrode and the grounded end of said conductor, caused by the presence of said first electrode in the created field.

5. Apparatus for determining the nature at two different depths of investigation of earth strata traversed by a bore hole, comprising a conductor having its upper end grounded and terminating at its lower end in an electrode adapted to be lowered into the bore hole, a motor disposed in the bore hole with the electrode and connected in series with said conductor, a source of alternating current of first frequency connected in series with said conductor for supplying current to said motor, an alternator of second frequency driven by said motor, and having a pair of spaced electrodes connected to the terminals thereof for creating an electric field in the formations, a second alternator of third frequency driven by said motor and having a pair of spaced electrodes connected to the terminals thereof, for creating a second electric field in the formations, means at the surface of the earth for obtaining indications of alternating potential differences of said second frequency between said first electrode and the grounded end of said conductor and produced by the presence of said first electrode in said first created field, and means at the surface of the earth for obtaining indications of alternating potential differences of said second frequency between said first electrode and the grounded end of said conductor and produced by the presence of said first electrode in said second field, and direct current indicating means connected to said conductor at the surface of the earth.

6. A method of investigating earth formations traversed by a bore hole comprising the steps of generating an alternating current of given frequency at the surface of the earth, transmitting said alternating current of given frequency to a given location in the bore hole, converting said alternating current of given frequency at said location to an alternating current of different frequency, passing said alternating current of different frequency through the formations surrounding the bore hole, picking up in the bore hole an electrical value of said different frequency which is a function of a characteristic of the formations, picking up a direct current value related to spontaneous potentials existing in the bore hole, combining said alternating and direct current values, transmitting said combined values to the surface of the earth, obtaining separate indications of said respective alternating and direct current values, and repeating said steps at different depths in the bore hole.

7. A method of investigating earth formations traversed by a bore hole, comprising the steps of producing an alternating current of given frequency at the surface of the earth, transmitting said current of given frequency to a given location in the bore hole, converting said current of given frequency at said location to a plurality of currents which are different in frequency from each other and from said current of given frequency, passing said plurality of currents of different frequency through the earth formations surrounding the bore hole in the vicinity of said location, picking up in the bore hole alternating electrical values corresponding in frequency to said currents of different frequency, and each of which is a function of a characteristic of the formations, picking up in the bore hole direct current values related to spontaneous potentials existing in the bore hole, combining said alternating and direct current values, transmitting said combined values to the surface of the earth, obtaining separate indications of said respective alternating and direct current values, and repeating said steps at different depths in the bore hole.

8. Apparatus for investigating earth formations traversed by a bore hole, comprising a plurality of spaced apart electrodes adapted to be lowered into the bore hole, means for converting electrical energy of given character to electrical energy of different character, said converting means being adapted to be lowered into the bore hole with the electrodes and being connected to two of the electrodes, a source of electrical energy of given character at the surface of the earth, electrical means for obtaining indications of direct current values only, second electrical means for obtaining indications of electrical values of said different character only, and a single electrical circuit connected to the electrical energy source, the energy converting means, the first and second indication obtaining means and another of said electrodes, whereby indications may be obtained simultaneously of natural potentials in the bore hole and of an electrical characteristic of earth formations traversed by the bore hole.

9. A method of simultaneously investigating electrical characteristics at different depths of investigation of the formations surrounding a bore hole, comprising the steps of generating electrical current of given character at the surface of the earth, transmitting said current of given character through a single electrical circuit to a given location in the bore hole, converting said current of given character at said location to a plurality of alternating currents of different frequencies which are different in character from said current of given character, simultaneously passing all of said converted alternating currents of said different frequencies through the adjoining formations by applying them to the formations in such a way as to be differently affected by electrical characteristics of the formations at different depths of investigation, obtaining electrical values from said respective currents of different frequencies resulting from their passage through said formations, which values are functions of the electrical characteristics of the formations at different depths of investigation, respectively, combining said electrical values, applying said combined electrical values to said single electrical circuit, and obtaining therefrom at the surface of the earth separate simultaneous indications of said electrical values.

10. A method of simultaneously investigating electrical characteristics at different depths of investigation of the formations surrounding a bore hole, comprising the steps of generating an alternating current of given frequency at the surface of the earth, transmitting said current of given frequency through a single electrical circuit to a given location in the bore hole, converting said current of given frequency at said location to a plurality of alternating currents which are different in frequency from each other and from said current of given frequency, simultaneously passing all of said converted currents of said different frequencies through the adjoining formations by applying them to the formations in such a way as to be differently affected by electrical characteristics of the formations at different depths of investigation, obtaining electrical values from said respective currents of different frequencies resulting from their passage through said formations, which values are functions of the electrical characteristics of the formations at different depths of investigation, respectively, combining said electrical values, applying said combined electrical values to said single electrical circuit, and obtaining therefrom at the surface of the earth separate simultaneous indications of said electrical values.

11. Apparatus for simultaneously investigating electrical characteristics at different depths of investigation of the formations surrounding a bore hole, comprising means to generate an electrical current of given character at the surface of the earth, a single electrical circuit to transmit said current to a given location in the bore hole, means in the bore hole to convert said current of given character to a plurality of alternating currents of different frequencies which are different in character from said current of given character, means including pairs of electrodes to pass all of said converted alternating currents of said different frequencies simultaneously through the adjoining formations in such a way as to be differently affected by electrical characteristics of the formations at different depths of investigation, pickup means including a pair of electrodes at least one of which is in the bore hole for obtaining electrical values from said respective currents of different frequencies resulting from their passage through the said formations, said current passing electrodes of each pair and said pickup electrodes being spaced different distances, respectively, and said pickup means being in electrical connection with said single electrical circuit to apply said electrical values to said single electrical circuit, and means at the surface of the earth in electrical connection with said electrical circuit for obtaining separate simultaneous indications of said electrical values.

HENRI GEORGES DOLL.